United States Patent
Blea et al.

(10) Patent No.: US 10,146,453 B2
(45) Date of Patent: *Dec. 4, 2018

(54) DATA MIGRATION USING MULTI-STORAGE VOLUME SWAP

(71) Applicant: International Business Machines Corporation, Armonk, NY (US)

(72) Inventors: Amy N. Blea, Round Rock, TX (US);
David R. Blea, Tucson, AZ (US);
Gregory E. McBride, Vail, AZ (US);
William J. Rooney, Hopewell Junction, NY (US); John J. Wolfgang, Midlothian, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,612

(22) Filed: Jun. 29, 2016

(65) Prior Publication Data

US 2016/0313935 A1  Oct. 27, 2016

Related U.S. Application Data

(63) Continuation of application No. 14/034,518, filed on Sep. 23, 2013, now Pat. No. 9,405,628.

(51) Int. Cl.
*G06F 17/30* (2006.01)
*G06F 3/06* (2006.01)
(Continued)

(52) U.S. Cl.
CPC .............. *G06F 3/0619* (2013.01); *G06F 3/06* (2013.01); *G06F 3/065* (2013.01); *G06F 3/067* (2013.01);
(Continued)

(58) Field of Classification Search
CPC ...... G06F 3/065; G06F 11/14; G06F 11/1446; G06F 11/2082; G06F 17/30079;
(Continued)

(56) References Cited

U.S. PATENT DOCUMENTS

| 5,304,980 A | 4/1994 | Maekawa |
| 5,446,871 A * | 8/1995 | Shomler ............. G06F 11/2064 714/1 |

(Continued)

FOREIGN PATENT DOCUMENTS

| CN | 101615133 | 12/2009 |
| EP | 1569115 | 8/2005 |
| WO | 2012147013 | 11/2012 |

OTHER PUBLICATIONS

IBM, "IBM HyperSwap Technology", IBM Advanced Technology Support, Americas, dated Jul. 28, 2008, pp. 1-18.
(Continued)

*Primary Examiner* — Merilyn Nguyen
(74) *Attorney, Agent, or Firm* — William K. Konrad; Konrad Raynes Davda & Victor LLP

(57) ABSTRACT

In one embodiment of the present description, data is migrated to a replacement source storage unit of a storage subsystem while being mirrored from the original source storage unit of a storage subsystem to an original target storage unit of a storage subsystem, and the original source storage unit and the replacement storage unit are swapped in a multi-storage volume swap to write updates to the replacement source storage unit instead of the original source storage unit, in input/output operations issued by at least one host. Further, data stored in the replacement source storage unit, is mirrored from the replacement source storage unit to the original target unit. Other aspects are described.

21 Claims, 7 Drawing Sheets

(51) Int. Cl.
*G06F 11/14* (2006.01)
*G06F 11/20* (2006.01)
(52) U.S. Cl.
CPC .......... *G06F 11/14* (2013.01); *G06F 11/2069* (2013.01); *G06F 11/2082* (2013.01); *G06F 17/30079* (2013.01); *G06F 17/30578* (2013.01)
(58) Field of Classification Search
CPC .. G06F 3/067; G06F 11/2076; G06F 2201/84; G06F 3/0631
See application file for complete search history.

(56) References Cited

U.S. PATENT DOCUMENTS

| | | | | |
|---|---|---|---|---|
| 6,145,066 | A * | 11/2000 | Atkin | G06F 3/0605 709/208 |
| 6,304,980 | B1 * | 10/2001 | Beardsley | G06F 11/2064 707/999.202 |
| 6,671,705 | B1 * | 12/2003 | Duprey | G06F 11/2058 |
| 6,877,016 | B1 * | 4/2005 | Hart | G06F 11/1466 |
| 7,039,777 | B2 | 5/2006 | Yamagami et al. | |
| 7,467,268 | B2 | 12/2008 | Lindemann et al. | |
| 7,549,027 | B1 | 6/2009 | McAndrews et al. | |
| 7,640,409 | B1 | 12/2009 | Stafford et al. | |
| 7,650,533 | B1 * | 1/2010 | Saxena | G06F 11/1451 714/13 |
| 8,209,496 | B2 | 6/2012 | Stewart | |
| 8,577,836 | B2 | 11/2013 | Kopylovitz et al. | |
| 8,689,054 | B1 | 4/2014 | van der Goot | |
| 8,990,158 | B2 | 3/2015 | Clayton | |
| 9,081,842 | B1 * | 7/2015 | Natanzon | G06F 17/30578 |
| 9,405,628 | B2 | 8/2016 | Blea et al. | |
| 9,619,331 | B2 | 4/2017 | Blea et al. | |
| 9,665,307 | B1 | 5/2017 | LeCrone et al. | |
| 2002/0016827 | A1 * | 2/2002 | McCabe | G06F 11/2058 709/213 |
| 2003/0033494 | A1 | 2/2003 | Fujibayashi et al. | |
| 2004/0260899 | A1 | 12/2004 | Kern et al. | |
| 2005/0081091 | A1 | 4/2005 | Bartfai et al. | |
| 2005/0108304 | A1 | 5/2005 | Wilson et al. | |
| 2005/0204106 | A1 | 9/2005 | Testardi | |
| 2005/0251633 | A1 * | 11/2005 | Micka | G06F 11/2058 711/162 |
| 2006/0236048 | A1 | 10/2006 | Deguchi et al. | |
| 2007/0043887 | A1 | 2/2007 | Wang et al. | |
| 2007/0192526 | A1 * | 8/2007 | Sharma | G06F 3/0605 710/311 |
| 2008/0022058 | A1 | 1/2008 | Nadathur et al. | |
| 2008/0065843 | A1 | 3/2008 | Bartfai et al. | |
| 2009/0006794 | A1 | 1/2009 | Mizuta et al. | |
| 2009/0019096 | A1 | 1/2009 | Kern et al. | |
| 2010/0169253 | A1 * | 7/2010 | Tan | G06F 9/5088 706/21 |
| 2010/0180093 | A1 | 7/2010 | Huber et al. | |
| 2011/0093862 | A1 | 4/2011 | Doatmas et al. | |
| 2011/0099360 | A1 | 4/2011 | Bashir et al. | |
| 2011/0219192 | A1 | 10/2011 | Blea et al. | |
| 2011/0264878 | A1 | 10/2011 | Blea et al. | |
| 2012/0221790 | A1 | 8/2012 | Nunez et al. | |
| 2012/0259810 | A1 | 10/2012 | Kopylovitz et al. | |
| 2013/0080704 | A1 | 3/2013 | Brown et al. | |
| 2013/0173537 | A1 * | 7/2013 | Wilkinson | G06F 17/30584 707/611 |
| 2014/0195483 | A1 | 7/2014 | Clayton | |
| 2015/0154274 | A1 | 6/2015 | Clayton | |
| 2015/0204106 | A1 | 7/2015 | Hedley | |

OTHER PUBLICATIONS

IBM, "GDPS—The e-business Availability Solution", Executive Summary, dated Mar. 2005, Software Communications, Somers, New York, pp. 1-30.

IBM, "z/os Basic HyperSwap", dated Apr. 2008, IBM Systems Storage, pp. 1-23.

Rooney, W. et al., "TotalStorageProductivity Center for Replication for z/OS", dated 2008, IBM Systems Journal vol. 47, No. 4, pp. 1-14.

US Patent Application, dated Sep. 23, 2013, for U.S. Appl. No. 14/034,518, filed Sep. 23, 2013, invented by Amy N. Blea et al., Total 48 pages.

Office Action, dated Nov. 4, 2015, for U.S. Appl. No. 14/034,518, filed Sep. 23, 2013, invented by Amy N. Blea et al., Total 15 pages.

Response to Office Action, dated Feb. 4, 2016, for U.S. Appl. No. 14/034,518, filed Sep. 23, 2013 invented by Amy N. Blea et al., Total 12 pages.

Notice of Allowance, dated Mar. 29, 2016, for U.S. Appl. No. 14/034,518, filed Sep. 23, 2013, invented by Amy N. Blea et al., Total 14 pages.

US Patent Application, dated Jan. 18, 2014, for U.S. Appl. No. 14/158,779, filed Jan. 18, 2014, invented by David R. Blea et al., Total 49 pages.

Office Action, dated Feb. 16, 2016, for U.S. Appl. No. 14/158,779, filed Jan. 18, 2014, invented by David R. Blea et al., Total 31 pages.

Response to Office Action, dated May 16, 2016, for U.S. Appl. No. 14/158,779, filed Jan. 18, 2014, invented by David R. Blea et al. Total 13 pages.

Final Office Action, dated Jun. 15, 2016, for U.S. Appl. No. 14/158,779, filed Jan. 18, 2014, invented by David R. Blea et al., Total 26 pages.

Brooks, C., et al, "IBM System Storage Business Continuity Solutions Overview", dated Feb. 2007, International Technical Support Organization, IBM System Storage Business Continuity Solutions Overview, pp. 1-190.

Wikipedia, "FlashCopy", (online) retrieved from the Internet on Jul. 22, 2013, at URL>http://en.wikipedia.org/wiki/FlashCopy, pp. 1-2.

Wikipedia, "IBM Global Mirror", (online), retrieved from the Internet on Jul. 22, 2013, at URL>http://en.wikipedia.org/wiki/Global_Mirror, pp. 1-2.

Wikipedia, "Peer to Peer Remote Copy", (online) retrieved from the Internet on Jul. 22, 2013, at URL>http://en.wikipedia.org/wiki/Metro_Mirror, 1 pp.

Wikipedia, "Snapshot (computer storage)", (online) retrieved from the Internet on Jul. 22, 2013, at URL>http://en.wikipedia.org/wiki/Snapshot_(computer_storage), pp. 1-4.

Response to Office Action, dated Jul. 6, 2017. For U.S. Appl. No. 15/441,119, filed Feb. 23, 2017, invented by Amy N. Blea et al., Total 13 pages.

Final Office Action, dated Jul. 26, 2017, for U.S. Appl. No. 15/441,119, filed Feb. 23, 2017, invented by Amy N. Blea et al., Total 31 pages.

Response to Final Office Action, dated Oct. 17, 2016, for U.S. Appl. No. 14/158,779, filed Jan. 18, 2014, invented by David R. Blea et al., Total 14 pages.

Notice of Allowance, dated Dec. 2, 2013, for U.S. Appl. No. 14/158,779, filed Jan. 18, 2014, invented by David R. Blea et al., Total 9 pages.

US Patent Application, dated Feb. 23, 2017, for U.S. Appl. No. 15/441,119, filed Feb. 23, 2017, invented by Amy N. Blea et al., Total 49 pages.

Office Action, dated Apr. 6, 2017, for U.S. Appl. No. 15/441,119, filed Feb. 23, 2017, invented by Amy N. Blea et al., Total 35 pages.

M. Banikazemi, et al.,"Storage-Based Intrusion Detection for Storage Area Networks (SANs)" dated 2005. Thomas J. Matson Research Center IBM Research, Proceedings of the 22nd IEEE/13th NASA Goddard Conference on Mass Storage Systems and Technologies (MSST 2005), Total 10 pages.

Response to Final Office Action, dated Oct. 26, 2017 , for U.S. Appl. No. 15/441,119, filed Feb. 23, 2017, invented by Amy N. Blea et al., Total 14 pages.

Office Action, dated Dec. 8, 2017 for U.S. Appl. No. 15/441,119, filed Feb. 23, 2017, invented by Amy N. Blea et al., Total 23 pages.

Response to Office Action, dated Mar. 8, 2018, for U.S. Appl. No. 15/441,119, filed Feb. 23, 2017, invented by Amy N. Blea et al., Total 13 pages.

(56) References Cited

OTHER PUBLICATIONS

Final Office Action, dated Apr. 13, 2018, for U.S. Appl. No. 15/441,119, filed Feb. 23, 2017, invented by Amy N. Blea et al., Total 25 pages.

* cited by examiner

DATA MIGRATION USING MULTI-STORAGE VOLUME SWAP

BACKGROUND OF THE INVENTION

1. Field of the Invention

The present invention relates to a method, system, and program for migrating data to a replacement storage using a multi-storage volume swap.

2. Description of Related Art

Data backup systems can provide continuous availability of production data in the event of a sudden catastrophic failure at a single point in time or data loss over a period of time. In one such disaster recovery system, production data is replicated from a local site to a remote which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

In data mirroring systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices. A source may have multiple targets in a multi-target configuration.

Tivoli Productivity Center for Replication is an example of an application that customers may use to manage planned and unplanned outages. The Tivoli Productivity Center for Replication application can detect failures at the primary storage system which may be at a local site, for example. Such failures may include a problem writing or accessing primary storage volumes at the local site. When the Tivoli Productivity Center for Replication recovery application detects that a failure has occurred, it can invoke a multi-storage volume swapping function, an example of which is the IBM HyperSwap® function. This function may be used to automatically swap processing for all volumes in the mirrored configuration from the local site to the remote site. As a consequence of the swap, the storage volumes at the remote site which were originally configured as the secondary volumes of the original copy relationship, are reconfigured as the primary volumes of a new copy relationship. Similarly, the storage volumes at the local site which were originally configured as the primary volumes of the original copy relationship, may be reconfigured as the secondary volumes of the new copy relationship, once the volumes at the local site are operational again.

In connection with the swapping function, a failover function may be invoked. In the Tivoli Productivity Center for Replication recovery application, the failover function can in some instances, obviate performing a full copy when re-establishing data replication in the opposite direction, that is, from the remote site back to the local site. More specifically, the failover processing resets or reconfigures the remote storage devices (which were originally configured as the secondary storage devices) to be the primary storage devices which are placed in a "suspended" status pending resumption of the mirroring operation but in the opposite direction. In the meantime, the failover processing starts change recording for any subsequent data updates made by the host to the remote site.

Once the local site is operational, failback processing may be invoked to reset the storage devices at the local site (which were originally configured as the primary storage devices) to be the secondary storage devices. Mirroring may then be resumed (but in the opposite direction, that is remote to local rather than local to remote) to resynchronize the secondary storage devices (originally the primary storage devices) at the local site to the data updates being stored at the primary storage devices (originally the secondary storage devices) at the remote site. Once data synchronization is complete, the HyperSwap® return operation can reestablish paths from the storage systems at the local site which were the original primary storage systems to the storage systems at the remote site which were the original secondary storage systems, and finish the failback operation to restore the storage devices at the local site as the primary storage devices of the pair. Mirroring may then be resumed (but in the original direction, that is local to remote rather than remote to local) to synchronize the secondary storage devices (that is, the original secondary storage devices) at the remote site to the data updates being stored at the primary storage devices (that is, the original primary storage devices) at the local site. Again, a full recopy of storage devices may be avoided.

In various situations, it may be appropriate to switch one or more volumes of the primary or source storage to corresponding volumes of a different source storage without significantly impacting the users' production work. For example, the user may wish to migrate the source storage to a new storage system, or to a different storage system, in order to improve overall performance or for reconfiguration purposes. FIG. 1 shows an example of a typical data replication session in which data on volumes 10 of a first storage control unit 20a, is being replicated on corresponding volumes 10 of a second data storage control unit 20b in an ongoing data replication process represented by arrows 30. In addition, the data on the volumes 10 of the first storage control unit 20a, is being migrated to corresponding volumes 10 of a third data storage control unit 20c in an ongoing data migration process represented by arrows 40.

Various products are available for migrating data from an existing storage system to a new storage system with little or no disruption to ongoing input/output (I/O) operations or to a disaster recovery capability which may be provided in case of a failure over the course of the data migration. Examples of such data migration products include TDMF (Transparent Data Migration Facility) by IBM Corporation or FDRPAS by Innovation Data Processing. However, if the volumes 10 of the storage control units 20a and 20b are part of an existing storage replication session such as the data replication process 30, for example, volumes 10 of a fourth control unit, such as storage control unit 20d have typically been provided in order to assure that failover capability is maintained.

Thus, in a typical migration process in which data stored on volumes 10 of storage control unit 20a are migrated from storage control unit 20a to corresponding volumes 10 of the storage control unit 20c, a fourth storage control unit 20d is typically provided, and a data replication process as indicated by the arrows 50 is started before the migration process 40, to replicate the data which may initially be stored on the storage control unit 20c, to the storage control unit 20d. The initial portion of the data replication process 50 includes configuring the volumes 10 of the storage control unit 20d to correspond to the volumes 10 of the storage control unit 20c which in turn have been configured to correspond to the volumes 10 of the storage control unit 20a, the source of the data to be migrated.

Thus, the overall migration process typically includes a wait for the two new storage control units 20c and 20d to reach full duplex status, that is, the configurations of the storage volumes 10 of the storage control unit 20c of the copy relationships of the storage control units 20c and 20d, have been replicated in the volumes 10 of the storage control unit 20d, and the data on those configured volumes 10 are identical to the initial data stored on the storage control unit 10c. At this point of the overall process, the migration process 40 is typically started using a migration product such as TDMF or FDRPAS, for example. The migration product will start copying data from storage control unit 20a to storage control unit 20c. Once data migration product has copied most of the data from storage control unit 20a to storage control unit 20c, it quiesces I/O to storage control unit 20a, copies the remaining changes (data writes) to storage control unit 20a, from storage control unit 20a to storage control unit 20c, and then swaps I/O requests to go to storage control unit 20c.

A data replication process such as the data replication process 30 may frequently involve many copy relationship pairs, often numbering in the thousands. Hence, in a typical data migration, a relatively smaller number of source volumes of the control unit 20a are selected at a time for migration to the new storage control unit 20c. Accordingly, the copy relationship pairs of those source volumes of the storage control unit 20a for migration are typically first added manually to the existing replication session represented by the process 50. The replication session process 50 is started (or restarted) and a wait is incurred until the added copy relationship pairs reach full duplex status in the replication process 50. Once full duplex status has been achieved for the added copy relationship pairs, the migration process 40 is started (or restarted) for the selected source volumes of the control unit 20a and another wait is typically incurred for the migration product to swap the selected volumes 10 from storage control unit 20a to the storage control unit 20c. Once that swap is complete, the selected copy relationship pairs for the volumes 10 in the storage control unit 20a and the storage control unit 20b are removed from the replication process 30 and their relationships terminated. This process is repeated until all source volumes of the storage control unit 20a to be migrated have been selected and processed as described above.

Data may also be migrated to a new storage system without using a data migration product such as such as TDMF or FDRPAS, for example. However, such data migration processes may result in interruptions to ongoing data replication processes or disaster recovery capabilities. One example of such a migration process may include selecting the source volumes 10 of the storage control unit 10 to be migrated to the new storage control unit 20c and first manually removing from the replication process 30, the copy relationship pairs for the selected volumes 10 in storage control unit 20a and the corresponding volumes 10 of the storage control unit 20b and terminating those relationship pairs. New copy relationship pairs corresponding to the terminated copy relationship pairs may then be manually reestablished between the new source volumes 10 in the storage control unit 20c and the original target volumes 10 in the storage control unit 20b.

In order to maintain the integrity of the consistency groups of the original replication process 30, these operations would typically be done outside of the scope of the replication process 30, and then added in to a new replication process between the storage control unit 20c and the original target storage control unit 20b once the volumes 10 of the new storage control unit 20c and the original target volumes 10 of the original target storage control unit 20b reach full duplex. Consequently, the user may be exposed to a system outage due to a storage failure while waiting for the migration process to complete.

SUMMARY

Provided are a method, system, and program for writing updates to original source storage units in response to received input/output operations which may be issued by at least one host for example, mirroring the data stored in the original source storage units including the updates, from the original source storage units to original target storage units while updates are actively being written to the original source storage units, migrating the data stored in the original source storage units including the updates from the original source storage units to replacement source storage units while actively mirroring the data stored in the original source storage units including the updates, from the original source storage units to the original target storage units, writing updates to the replacement source storage units instead of to the original source storage units, in response to received input/output operations; and mirroring data stored in the replacement source storage units, from the replacement source storage units to the original target storage units. In one embodiment storage units are swapped to write updates to the replacement source storage units instead of to the original source storage units, in response to input/output operations issued by at least one host. Other embodiments, aspects and features are described herein.

DETAILED DESCRIPTION

Figure 2:
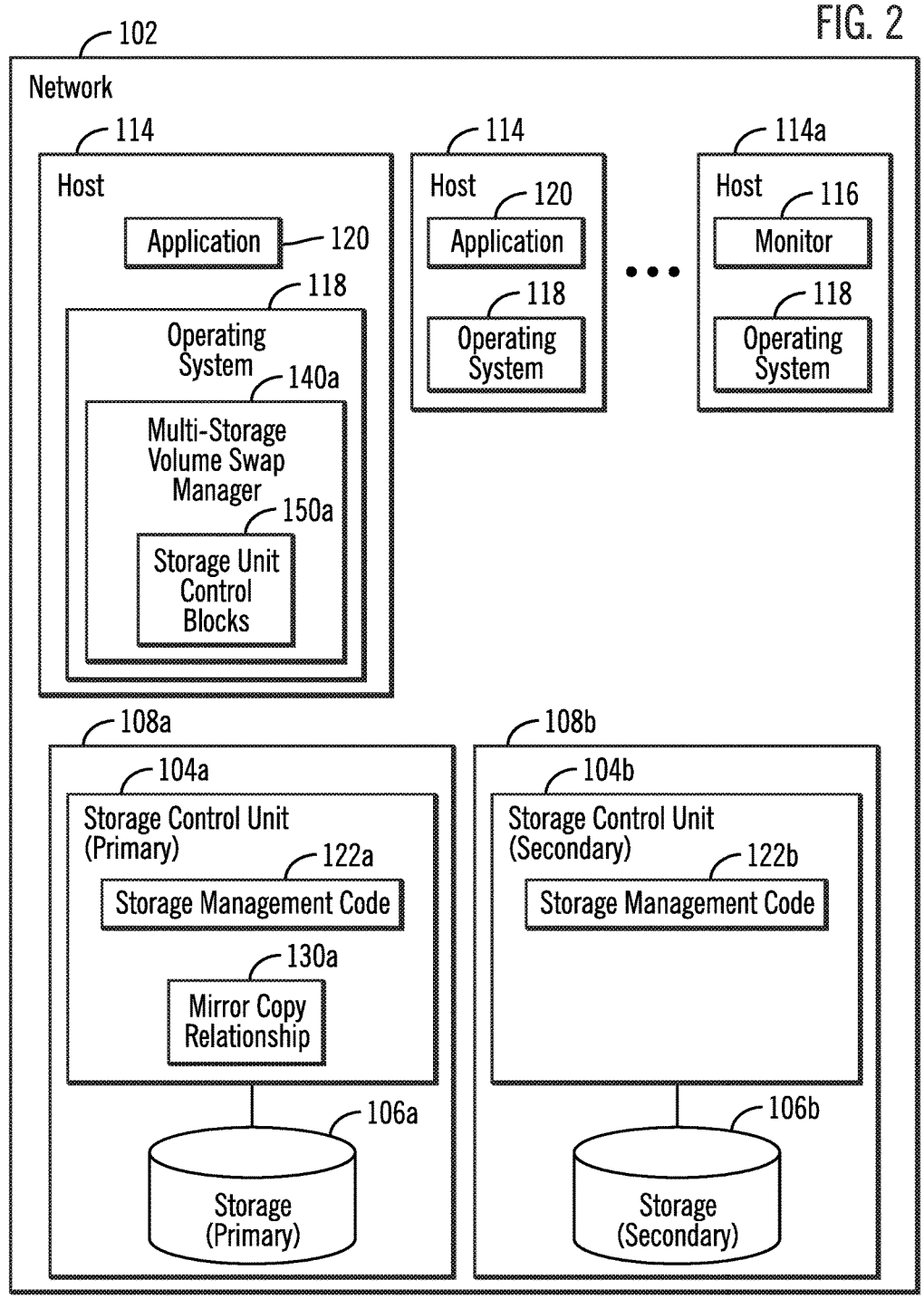
FIG. 2 illustrates an example of a network computing environment, employing a data migration using a multi-storage volume swap in accordance with one embodiment of the present description.

FIG. 2 illustrates an embodiment of a network computing environment having a mirror relationship between source storage locations of a source storage subsystem at one site and target storage locations of a target storage subsystem at another site in such a network computing environment or other data storage system. In one aspect of the present description, data stored in the one or more source storage locations of the original source storage subsystem may be migrated from the original source storage subsystem to corresponding storage locations of a replacement source storage subsystem while actively mirroring data stored in the original source storage system, from the original source storage subsystem to the original target storage subsystem, using a reduced number of replacement storage subsystems. In addition, the original source storage subsystem and the replacement storage subsystem may be swapped using a multi-storage volume swap to access the replacement source storage subsystem instead of the original source storage subsystem, in input/output operations issued by at least one host. Further, as a part of the multi-storage volume swap, copy relationship pairs in the original source and target storage subsystems may be terminated and reestablished in the replacement source and original target storage subsystems, such that data stored in the replacement source storage system, may then be mirrored from the replacement source storage subsystem to the original target storage subsystem.

Figure 1:
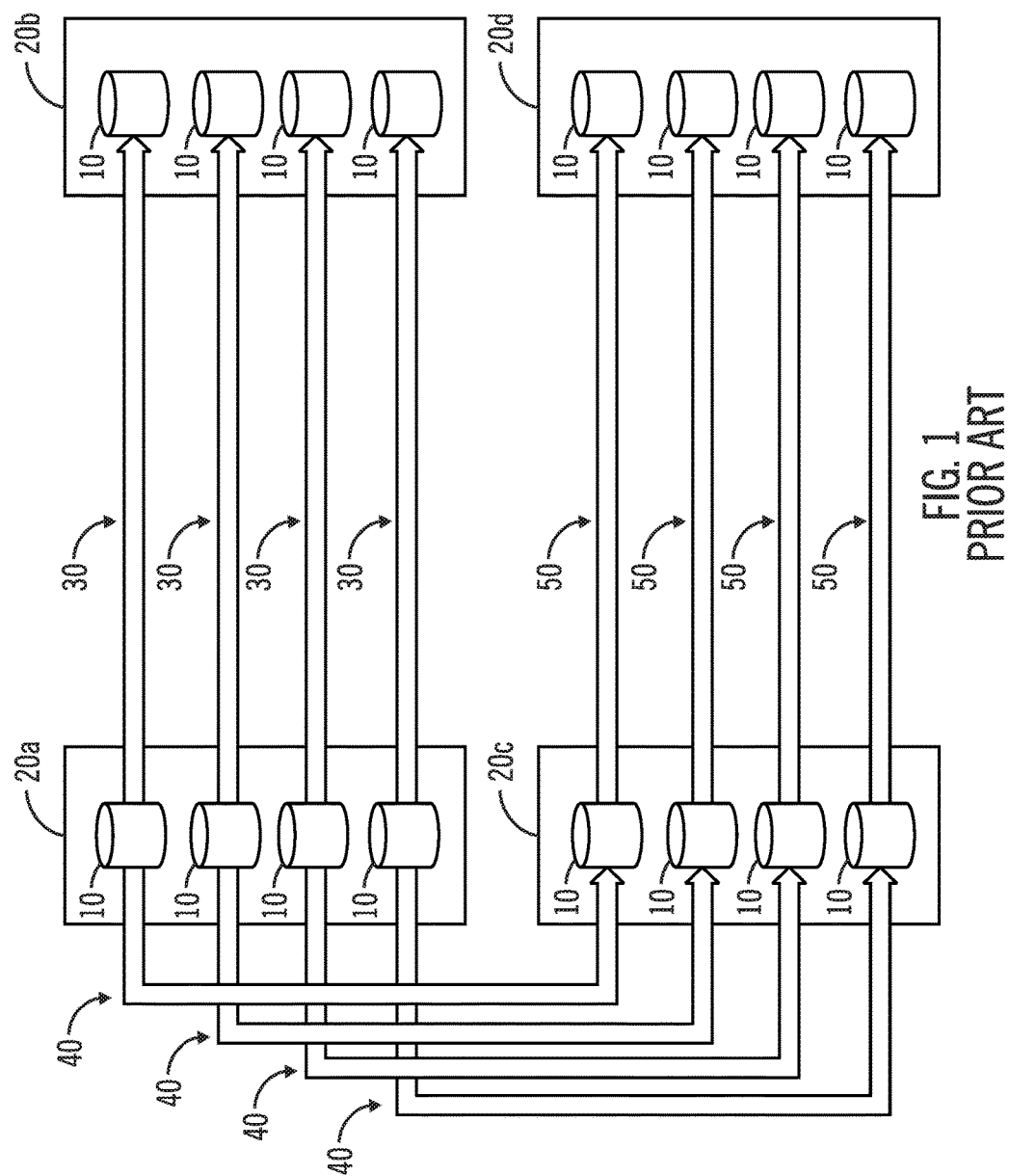
FIG. 1 illustrates a prior data migration process.

As explained in greater detail below, such an arrangement can establish mirroring from the replacement source storage system to the original target storage subsystem without requiring a full copy operation from the new source (the replacement source storage subsystem) and its target (the original target storage subsystem). In addition, such an arrangement can eliminate the provision of a fourth storage subsystem to support the migration operation. It is recognized that prior migration processes using existing data migration products can, as compared to a migration process in accordance with the present description, involve the use of twice as much storage as represented by the extra storage control unit 20*d* (FIG. 1), and can involve twice as much copying of data as represented by the extra copying process 50 of data from the storage control unit 20*c* to storage control unit 20*d*. Moreover, it is recognized that that prior migration processes using existing data migration products can result in an undesirable change of the target storage control unit, as represented by the change of the target control unit from the storage control unit 20*b* to the target storage control unit 20*d*.

Thus, a migration process in accordance with the present description can reduce the number of storage subsystems required for the process, yet nonetheless permit the ongoing mirror operation between the original source storage subsystem and the original target subsystem to proceed while the migration of data stored in the original source storage subsystem to the replacement source storage subsystem proceeds. Thus, interruptions to the original data replication session between the original source and target storage subsystems may be reduced or eliminated.

Still further, interruptions to a disaster recovery capability may be reduced or eliminated during the migration process notwithstanding the reduction in storage subsystems being used. Thus, full data integrity between the original source storage subsystem and the original target subsystem may be maintained while the migration of data stored in the original source storage subsystem to the replacement source storage subsystem proceeds.

In yet another aspect, many of the operations of a migration process in accordance with the present description may be automated such as terminating copy relationship pairs in the original source and target storage subsystems and reestablishing them in the replacement source and original target storage subsystems, such that data stored in the replacement source storage system, may then be mirrored from the replacement source storage subsystem to the original target storage subsystem. As explained in greater detail below, such automation may be provided in a multi-storage volume swap function. In contrast, it is appreciated that prior migration processes and operations frequently involve significant manual intervention, which are often time consuming, error prone, and could potentially result in some data loss.

Although the embodiment of FIG. 2 is described in connection with a mirror relationship, it is believed that aspects of the present description are applicable to other types of copy relationships, depending upon the particular application. Additional features are discussed in the present description. It is appreciated that still other features may be realized instead of or in addition to those discussed herein, depending upon the particular application.

In the illustrated embodiment, a copy relationship identifies a source storage location, such as a primary storage location, and a target storage location, such as a secondary storage location, in which data stored at the source storage location is to be mirrored or otherwise copied to the target storage location. Thus, as used herein, a primary storage location and a secondary storage location are storage locations related by a copy relationship.

Furthermore, as used herein, the term "storage location" refers to a storage location containing one or more units of data storage such as one or more volumes, cylinders, tracks, segments, extents, or any portion thereof, or other unit or units of data suitable for transfer. Thus, a source storage location and the associated target storage location may each be a storage volume, wherein the volumes are typically at different devices or sites. However, it is appreciated that a source storage location and a target storage location may each be of a size other than a volume, for example.

In the illustrated embodiment, a network 102 includes storage control units or storage controllers 104*a*, 104*b*, and data storages 106*a*, 106*b*. The storage control unit 104*a* and its associated data storage 106*a* provide a storage subsystem 108*a*. Similarly, the storage control unit 104*b* and its associated data storage 106*b* provide a storage subsystem 108*b*. The storage control units 104*a*, 104*b*, manage the copying of updates from a primary storage system to a secondary storage system. In the configuration illustrated in FIG. 1, the storage control unit 104*a* and the data storage 106*a* have been configured as a primary storage control unit and the primary storage, respectively. Similarly, the storage control unit 104*b* and its data storage 106*b* have been configured as a secondary storage control unit and a secondary storage, respectively. Hence, in the configuration depicted in FIG. 2, the storage control unit 104*a* will be referred to as a primary storage control unit 104*a* and the data storage 106*a* will be referred to as a primary storage 106*a*. Similarly, the storage control unit 104*b* will be referred to as a secondary storage control unit 104*b* and the data storage 106*b* will be referred to as a secondary data storage 106*b*. As explained in greater detail below, the storage control units and storages may be reconfigured to change the associated primary and secondary roles within a copy relationship.

The network 102 further includes one or more hosts 114 writing updates to the primary storage 106*a*. At least one such host 114, such as the host 114*a*, has in this embodiment, storage management functions including a monitor program 116 to monitor failures in the availability of the primary storage control unit 104*a*. In some embodiments, the monitor program 116 may be operated in a device apart from the hosts. The components 104*a*, 104*b*, 106*a*, 106*b*, and 114 are connected to the network 102 and the network 102 enables communication among these components. The network 102 may include one or more switches to provide one or more paths of communication between the different network 102 elements.

The primary storage control unit 104a is located at a first site and the secondary storage control unit 104b is located at a second site which may be geographically or functionally remote from the first site. Thus, in this example, the first site may be at a local site and the second site may be at a geographically remote site separated by a short or long geographical distance from the local site. Alternatively, the local and remote sites may be relatively close such as in different buildings in the same general geographical location, in different rooms of the same building, in different machines in the same room, or in different portions or partitions of the same machine, of the network 102.

A typical host 114 includes an operating system 118 and an application 120 that writes updates to the primary 106a or secondary 106b storage. The host 114a which includes the monitor program 116 may omit the update writing applications 120 in some embodiments. The primary 104a and secondary 104b storage control units include storage management software 122a and 122b to manage the data mirroring operations.

A first copy relationship 130a, which may be maintained for the primary 104a and secondary 104b storage control units, associates primary storage locations in the primary storage 106a and corresponding secondary storage locations in the secondary storage 106b, such that updates to the primary storage 106a locations are copied to the corresponding secondary storage 106b locations. In some embodiments, the updates to the primary storage 106a locations may be copied to the corresponding secondary storage 106b locations before they are written to the primary storage 106a.

In the illustrated embodiment, the first copy relationship 130a comprises a peer-to-peer mirror relationship for a pair of storage locations in which updates to the primary storage locations of the mirror relationship 130a are mirrored to the secondary storage locations of the mirror relationship 130a. It is appreciated that other types of copy relationships may be established, depending upon the particular application.

In connection with the copy relationship 130a, updates to the primary storage locations of the primary storage 106a are indicated in a bitmap, which is an out-of-sync (OOS) bitmap in the illustrated embodiment. The OOS bitmap is cleared as the storage management code 122a, 122b copies updates indicated in the OOS bitmap to the corresponding storage locations of the secondary storage 106b of secondary storage control unit 104b.

The storage management software 122a accesses updates to the primary (first) 106a to write to the corresponding storage locations in the storage 106b. In some applications, the copying and relationship functions may be performed by devices external to the storage systems 104a, 104b, such as the hosts 114, for example. In the illustrated embodiment, the copying relationship 130a is a mirroring process in which each write update to the primary storage 106a is mirrored over to the secondary storage 106b, and the I/O operation which performed the write operation to the primary storage 106a is not considered complete until the mirror operation is completed. Should the mirror operation fail such that the update was not successfully mirrored to the storage 106b, the write operation to the primary storage 106a is undone to maintain the full duplex status of the primary and secondary storage 106a, 106b. However, in some cases, the updates that did not complete being mirrored to the storage 106b can be recovered and applied to the storage 106b such that those updates to the storage 106a may be retained.

The monitor program 116 may monitor the primary storage control unit 104a and upon detecting a failure event, may utilize a multi-storage volume swap manager 140a of the storage management provided by an operating system 118 of a host 114, to cause a failover operation to cause updates from the host 114 to be sent to the secondary storage control unit 104b instead of to the primary storage control unit 104a. If the system fails while updates to the primary storage 106a are being applied to the storage 106b, then the updates that did not complete being mirrored to the storage 106b can be recovered and applied to the storage 106b.

In the illustrated embodiment, the multi-storage volume swap manager 140a provides a multi-storage volume swap function such as the IBM HyperSwap® function. As explained in greater detail below, a multi-storage volume swap function such as the IBM HyperSwap® may be modified in accordance with the present description to facilitate a swap operation in connection with a migration operation to replace a storage unit. Although the multi-storage volume swap manager 140a is a part of the operating system 118 of one or more hosts 114 in the illustrated embodiment, it is appreciated that a multi-storage volume swap manager may be implemented in application software of a host, or in the operating system or application software of a storage control unit, for example, for storage management functions.

The storage management code 122a, 122b is invoked to establish a copy relationship such as the first copy relationship 130a, between first and second storage locations in a first storage system and second storage system, respectively. The storage systems 104a, 104b may comprise enterprise storage servers, such as the IBM Enterprise Storage Server (ESS), for example.

The storage management code 122a, 122b managing the first copy relationship 130a may be implemented using synchronous copy operations, such as a peer-to-peer remote copy (PPRC) program. An example of a PPRC program is the IBM Tivoli Productivity Center for Replication copy program that enables the switching of updates to the primary storage 106a to the secondary storage 106b. The storage management code 122a, 122b may also implement asynchronous remote copy operations, where updates to the primary 106a or secondary 106b storage are mirrored to a corresponding location in at a remote site. Suitable asynchronous mirroring programs include XRC (or zGM). The described operations may be implemented with other programs such as other copy programs or other global recovery programs.

The network 102 includes a fabric which may comprise a Storage Area Network (SAN), Local Area Network (LAN), Intranet, the Internet, Wide Area Network (WAN), peer-to-peer network, wireless network, arbitrated loop network, etc. The storages 106a, 106b may comprise an array of storage devices, such as a Just a Bunch of Disks (JBOD), Direct Access Storage Device (DASD), Redundant Array of Independent Disks (RAID) array, virtualization device, tape storage, flash memory, etc.

Communication paths from the storage subsystems to the hosts 114 may be based upon a particular host attachment protocol such as FICON, for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

In the illustrated embodiment, communication hardware associated with the communication paths between the nodes includes switches, routers, cables, modems, adapters, power supplies, etc. Communication software associated with the communication paths includes instructions and other software controlling communication protocols and the operation of the communication hardware in accordance with the communication protocols, if any. It is appreciated that other communication path protocols may be utilized, depending upon the particular application.

Figure 3:
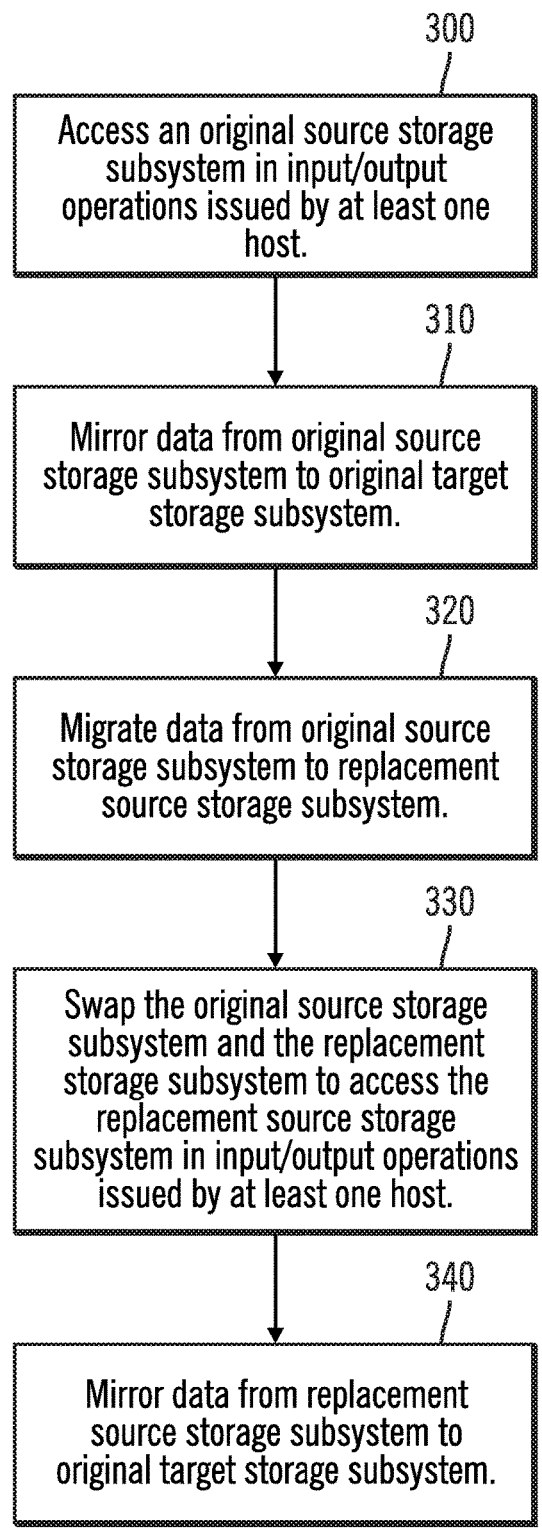
FIG. 3 illustrates an embodiment of operations to migrate data using a multi-storage volume swap in accordance with one embodiment of the present description.

FIG. 3 illustrates one example of operations of a networked storage system in which a migration operation to a replacement storage subsystem, is performed in accordance with one embodiment of the present description. In a first operation, an original source storage unit in a subsystem such as the storage subsystem 108a (FIG. 2), for example, is accessed (block 300) in input/output operations issued by at least one host such as one of the hosts 114. Data stored in the original source storage unit, is mirrored (block 310) from the original source storage unit to an original target storage unit in a storage subsystem such as the storage subsystem 108b. Software for performing the mirroring operation (block 310) may include a suitable copy services management tool, such as those provided by EMC (e.g. Geographically Dispersed Disaster Restart (GDDR), Symmetrix Remote Data Facility (SRDF), and AutoSwap), Hitachi (e.g. Hitachi Universal Replicator (HUR)), or IBM (e.g. Tivoli Storage Productivity Center for Replication). Such a tool may be utilized by storage management in accordance with the present description which can facilitate a migration of data as described herein.

Figure 4:
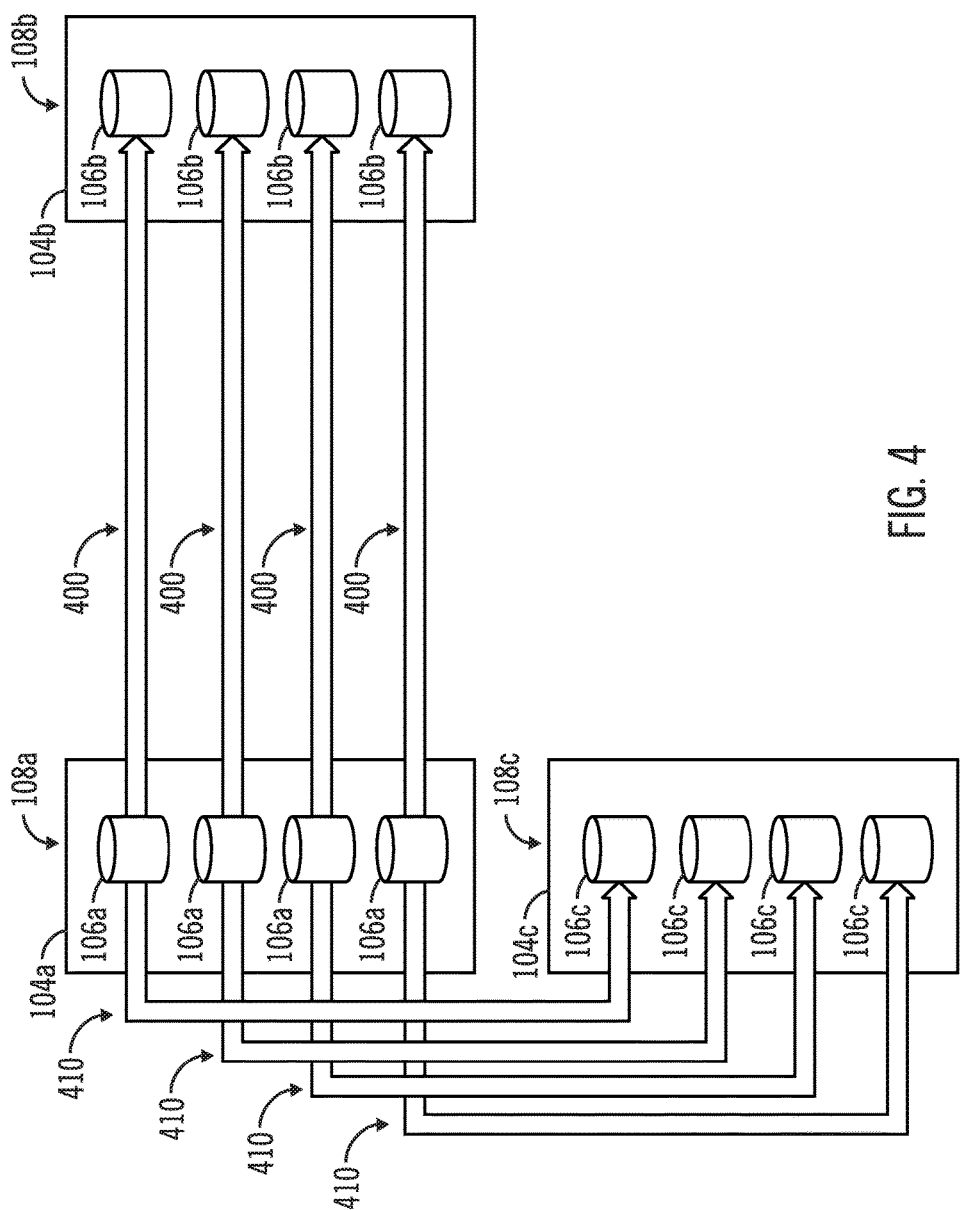
FIGS. 4 and 5 illustrate an example of a data migration in accordance with one embodiment of the present description.

FIG. 4 depicts an example of a mirror operation 400 mirroring data from the original source storage subsystem 108a to the original target storage subsystem 108b. In the illustrated embodiment, the mirroring of data stored in the original source storage system includes mirroring data from storage units of the original source storage subsystem to storage units of the original target storage subsystem in copy relationships with associated storage units of the original source storage subsystem. Thus, in this example, the mirror operation 400 copies data from a source volume 106a (a primary volume) of the storage control unit 104a of the storage subsystem 108a, to a target volume 106b (a secondary volume) of the storage control unit 104b of the storage subsystem 108b, pursuant to a copy relationship which includes the volume pair of the source volume 106a and the target volume 106b. Accordingly, any updates to the primary storage subsystem 108a are mirrored over to the secondary storage subsystem 108b in response to ongoing I/O operations and the copy relationships established between the source storage subsystem 108a and the target storage subsystem 108b. FIG. 4 depicts four such copy relationship pairs. However, it is appreciated that in a mirror relationship in a typical commercial setting, such copy relationship pairs may number in the tens, hundreds, thousands or more.

In another operation, data stored in the original source storage unit in a subsystem may be migrated (block 320, FIG. 3) from the original source storage unit to a replacement source storage unit in a subsystem while actively mirroring (block 310) data stored in the original source storage unit, from the original source storage unit to the original target storage unit. FIG. 4 depicts an example of a migration operation 410 migrating data from the original source storage subsystem 108a to a new replacement source storage subsystem 108c. The migration operation 410 copies data from a source volume 106a of the storage control unit 104a of the storage subsystem 108a, to a replacement source volume 106c of the storage control unit 104c of the storage subsystem 108c, pursuant to a copy relationship which includes the volume pair of the source volume 106a and the replacement source volume 106c. Accordingly, any updates to the primary storage subsystem 108a are mirrored not only to the secondary storage subsystem 108b in response to ongoing I/O operations and the copy relationships established between the source storage subsystem 108a and the target storage subsystem 108b, but are also mirrored over to the replacement source storage subsystem 108c in response to ongoing I/O operations and the copy relationships established between the original source storage subsystem 108a and the replacement storage subsystem 108c. FIG. 4 depicts four such copy relationship pairs corresponding to the copy relationship pairs of the migration operation 410. However, again it is appreciated that in a migration relationship in a typical commercial setting, such copy relationship pairs may number in the tens, hundreds, thousands or more.

Figure 5:
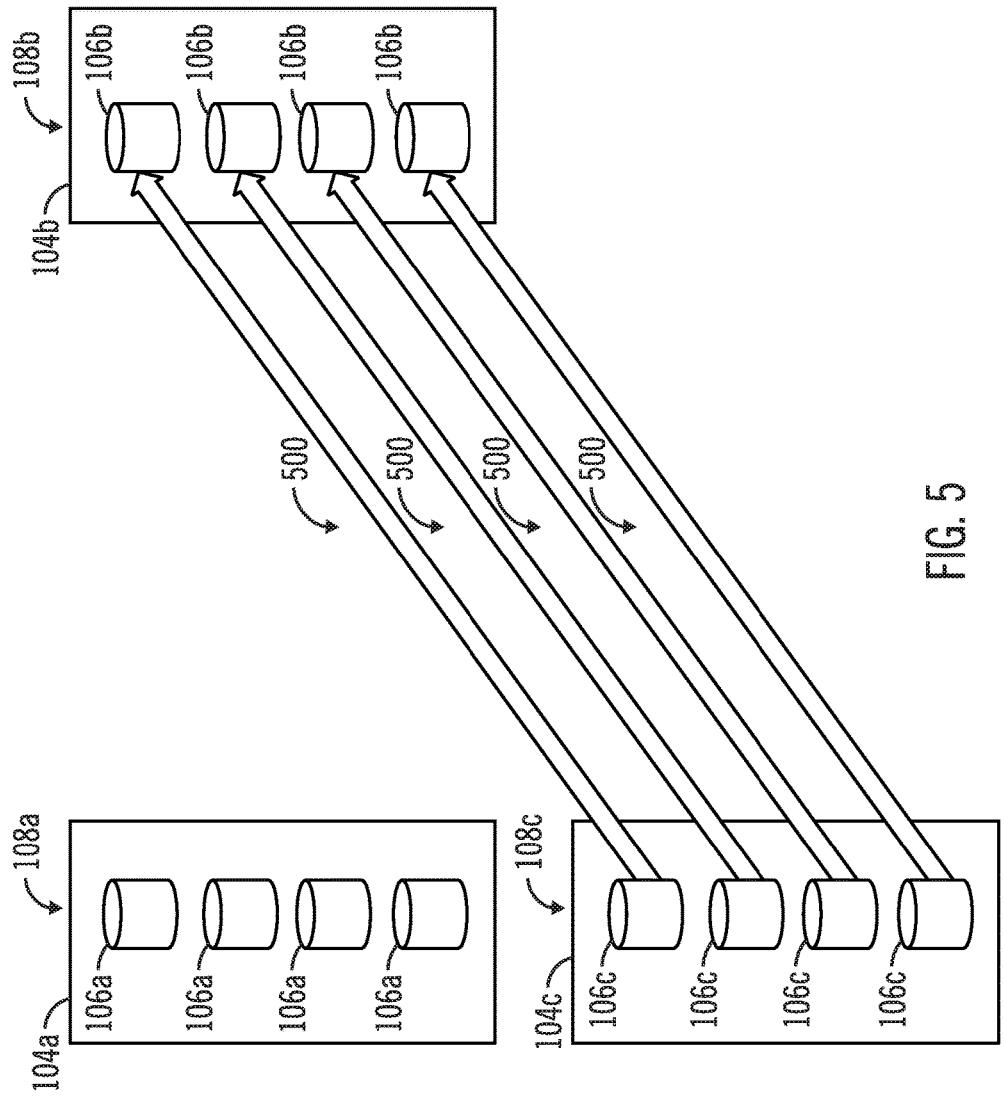

The original source storage subsystem and the replacement storage subsystem may be swapped (block 330, FIG. 3) to access the replacement source storage subsystem instead of the original source storage subsystem, in input/output operations issued by at least one host. In the illustrated embodiment, the swapping operation 330 may be performed when the migration operation (block 320) is complete or nearing completion. For example, FIG. 5 depicts the source storage subsystem 108a and the replacement source storage system 108c with the migration operation 410 omitted to represent the completion of the migration operation 410. It is appreciated that in other embodiments, the swap operation may be performed at another time relative to the migration operation (block 320), depending upon the particular application.

In accordance with one aspect of the present description, the swapping operation (block 330) may be performed using a multi-storage volume swap function such as the IBM HyperSwap® function, which may be modified in accordance with the present description. For example, as explained in greater detail below, a multi-storage volume swap function such as the IBM HyperSwap® may be modified in accordance with the present description to facilitate a swap operation (block 330) in connection with a migration operation (block 320).

For example, the swap operation (block 330) may include temporarily quiescing I/O operations from the hosts and terminating the copy relationships of the target storage subsystem with associated storage units of the original source storage subsystem. In one embodiment, the multi-storage volume swap function can automatically quiesce I/O operations and terminate the copy relationship pairs of the mirror operation 400 (FIG. 4) from the original source storage subsystem 108a to the original target storage subsystem 108b upon completion or near completion of the migration operation 410 (FIG. 4). Hence, FIG. 5 depicts the original source storage subsystem 108a and the original target storage system 108b with the mirror operation 400 omitted to represent the termination of the copy relationship pairs of that mirror operation 400 upon completion or near completion of the migration operation 410 (FIG. 4).

Furthermore, the swap operation (block 330) can include reestablishing the previously terminated copy relationships as replacement copy relationships of the target storage subsystem with associated storage units of the replacement source storage subsystem instead of the original source storage subsystem. Thus, in one embodiment, the multi-storage volume swap function can automatically reestablish the copy relationship pairs of the original mirror operation 400 (FIG. 4), as replacement copy relationship pairs of a replacement mirror operation 500 (FIG. 5) from the replacement source storage subsystem 108c to the original target storage subsystem 108b upon completion or near completion of the migration operation 410. Hence, FIG. 5 depicts the replacement source storage subsystem 108c and the original target storage system 108b with the replacement mirror operation 500 to represent the reestablishment of the copy relationship pairs which were terminated in connection with the original mirror operation 400 (FIG. 4), but are now reestablished in connection with the replacement mirror operation 500 from the replacement source storage subsystem 108c to the original target storage subsystem 108b (FIG. 5). The swap operation (block 330) may be completed so that I/O operations once resumed, are directed to the replacement source storage subsystem 108c instead of to the original source storage subsystem. Because I/O operations were quiesced at the host or hosts prior to swapping to the replacement source storage subsystem, it is appreciated that when the relationship from the replacement source storage subsystem to the original target storage subsystem is established, that the data of the replacement source storage unit is still the same as that of the original target storage unit. Hence, the relationships for the mirror operation from the replacement storage subsystem to the original target storage subsystem may be established in a 'no copy' operation such that copying from the replacement storage subsystem as a part of the setup may be fully or at least partially avoided.

Once the replacement copy relationship pairs have been established and the swap completed, the I/O operations may resume so that the storage subsystems mirror (block 340, FIG. 3; arrows 500, FIG. 5) data from storage units of the replacement source storage subsystem to storage units of the original target storage subsystem in the reestablished copy relationships with associated storage units of the replacement source storage subsystem. Thus, any new data writes to the replacement storage subsystem 108c will be mirrored to the original target storage subsystem 108b pursuant to the mirror operation (block 340, FIG. 3; arrows 500, FIG. 5).

Should a failure occur at any time during the overall migration process depicted in FIGS. 3, 4, and 5, provision may be made for recovery from such a failure event without loss of data or a long interruption in I/O operations. For example, if a failure occurs in the original source storage subsystem 108a while data is being migrated (block 320) from the original source storage subsystem 108a to the replacement storage subsystem 108c, a multi-storage volume swap capability such as HyperSwap® may switch I/O operations to the secondary storage subsystem which is the original target storage subsystem 108b in this example. The original target storage subsystem 108b is at full duplex with respect to the original source storage subsystem 108a due to the ongoing mirror operations (block 310, FIG. 3; arrows 400, FIG. 4) to reduce or eliminate the likelihood of data loss due to a failure of the original source storage subsystem 108a.

Conversely, if a failure occurs in the replacement storage subsystem 108c once migration is complete or near completion and the swap operation (block 330) from the original source storage subsystem 108a to the replacement source storage subsystem 108c has taken place, a multi-storage volume swap capability such as HyperSwap® may switch I/O operations from the replacement storage subsystem (storage subsystem 108c) to the secondary storage subsystem which, again, is the original target storage subsystem 108b, in this example.

In the illustrated embodiment, the multi-storage volume swap operation (block 330) may be configured to proceed in a fully automatic fashion with no user input such that the multi-storage volume swap operation (block 330) may proceed very quickly. As a result, the likelihood of a failure of the original source storage subsystem 108a or the replacement source storage subsystem 108c during the multi-storage volume swap operation (block 330) may be quite small. However, as explained in greater detail below, I/O operations may be quiesced during the multi-storage volume swap operation (block 330) to reduce or eliminate the chance of data loss in the unlikely event of a failure during the multi-storage volume swap operation (block 330).

In one embodiment, a storage subsystem may have a separate storage control unit for controlling access to the storage units of the particular storage subsystem. However, it is appreciated that in other embodiments, a storage control unit may be shared amongst one or more storage subsystems, for controlling access to various storage units of the storage subsystems. Thus, storage units of the original source storage subsystem and the replacement storage subsystem, for example, may share a storage control unit and be controlled by the shared storage control unit.

In the illustrated embodiment, the original source storage units, the original target storage units, and the replacement source storage units are depicted as being in separate storage subsystems, that is, an original source storage subsystem, an original target storage subsystem and a replacement source storage subsystem, respectively. However, it is appreciated that one or more storage units of the original source storage units, original target storage units, and the replacement source storage units may reside in one or more common storage subsystems, such as a cloud based storage system, for example, depending upon the particular application.

Figure 6:
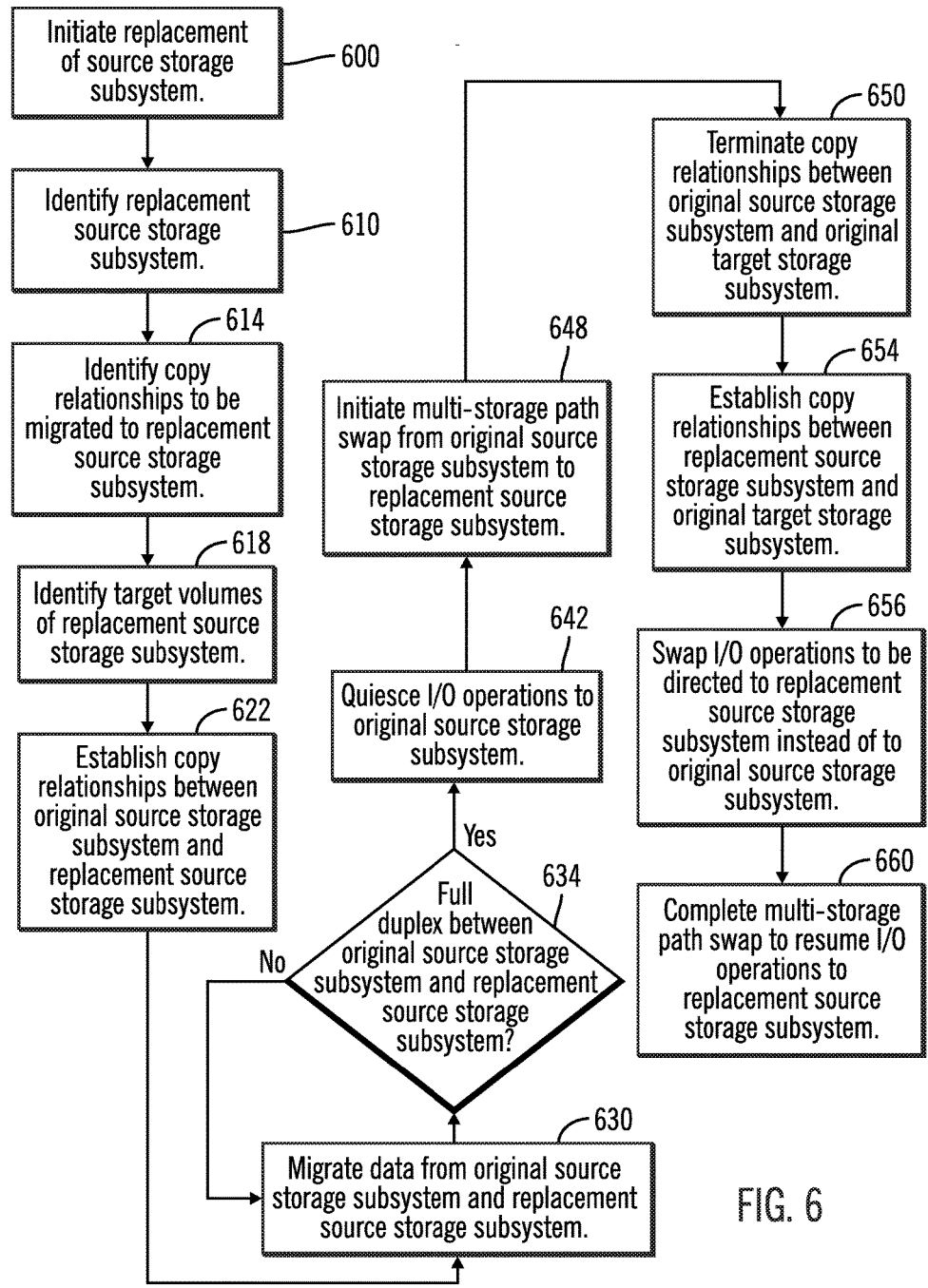
FIG. 6 illustrates another embodiment of operations to migrate data using a multi-storage volume swap in accordance with one embodiment of the present description.

FIG. 6 illustrates another example of operations of a networked storage system in which a migration operation to a replacement storage subsystem, is performed in accordance with one embodiment of the present description. In this example, like that of the example of FIG. 2, original source storage units of a subsystem such as the storage subsystem 108a (FIG. 2), for example, are accessed in input/output operations issued by at least one host such as one of the hosts 114. Any data stored and any updates to that data in the original source storage units of the subsystem, are mirrored from the original source storage units of the subsystem to original target storage units of a storage sub system.

In this example, replacement of one or more source storage units is initiated (block 600). In one embodiment, the replacement may be initiated by a command issued to copy services management software of the storage management to replace storage units of a source storage subsystem. For example, when all the mirror copy relationship pairs of the mirror operation (such as the mirror operation 400, FIG. 4, block 310, FIG. 3) are at full duplex status and the mirror copy session is in a prepared state, a command such as a "Change Source" command may become available to the user to change the source from the original source storage subsystem to replacement storage units of a storage subsystem. Thus, the migration including a multi-storage volume swap function may be initiated by a human operator. In another embodiment, the storage management may automatically initiate the multi-storage volume swap to change the source from the original source storage subsystem to the replacement storage subsystem. Thus, the command may be issued by a human operator or may be triggered automatically by some event, such as detection of a degradation in performance of the original source storage subsystem, for example.

In one embodiment, a swap of a replacement storage subsystem for an original source storage subsystem may be done fully automatically without the need for human intervention. For example, in applications in which storage systems or subsystems are monitored for system performance, such as IBM's z/OS Workload Manager (WLM), for example, the existence of a performance problem may be detected and the problem addressed by moving a source volume to another source volume, possibly in a different storage subsystem, and the WLM could be modified in accordance with the present description to initiate the migration.

In another operation, upon initiation (block 600) of the replacement, a replacement source storage unit in a storage subsystem is identified (block 610). In one embodiment, one or more suitable replacement source storage units in a replacement source storage subsystem may be identified automatically with little or no human operator intervention. For example, the copy management software can, in response to a command to initiate the change of the source storage units, automatically identify a list of candidate replacement source storage units, and in a suitable user interface, present the list of candidate replacement source storage units to a human operator. In response, the human operator may select a suitable replacement source storage unit from the list of candidate replacement source storage units. In one embodiment, candidate replacement source storage units in a storage subsystem may already be defined as being managed by the storage management software.

As used herein, the term "automatically" includes both fully automatic, that is operations performed by one or more software controlled machines with no human intervention such as user inputs to a graphical user interface. As used herein, the term "automatically" further includes predominantly automatic, that is, most of the operations (such as greater than 50%, for example) are performed by one or more software controlled machines with no human intervention such as user inputs to a graphical user interface, and the remainder of the operations (less than 50%, for example), are performed manually, that is, the manual operations are performed by one or more software controlled machines with human intervention such as user inputs to a graphical user interface to direct the performance of the operations.

Thus, in the example above, the copy management software can fully automatically identify a list of candidate replacement source storage units, and in a suitable user interface, present the list of candidate replacement source storage units to a human operator. In response, the human operator may select a suitable replacement source storage unit from the list of candidate replacement source storage units. In this manner, the replacement source storage unit and its storage subsystem may be identified (block 610) in a predominantly automatic fashion. In other embodiments, the replacement source storage units may be identified (block 610) fully automatically, that is, without human intervention, or may be identified, manually by a human operator and the selection manually input into a graphical user interface.

Upon identification (block 610) of suitable replacement source storage units, copy relationships to be migrated to the replacement source storage units and their storage subsystem are identified (block 614). In one embodiment, the copy management software can, in response to a command to initiate the change of the source storage unit, fully automatically identify a list of candidate copy relationships to be migrated, and in a suitable user interface, present the list of candidate copy relationships to be migrated to a human operator. In response, the human operator may select one or more suitable copy relationships to be migrated from the list of candidate replacement copy relationships to be migrated. In this manner, the replacement copy relationships to be migrated may be identified (block 614) in a predominantly automatic fashion. In other embodiments, the replacement source storage units and their storage subsystem may be identified (block 614) fully automatically, that is, without human intervention, or may be identified manually by a human operator and the selection manually input into a graphical user interface.

Upon identification (block 614) of copy relationships to be migrated to the replacement source storage subsystem, target storage units such as target volumes of the replacement source storage subsystem may be identified (block 618). In one embodiment, the storage management software can fully automatically select (block 618) the appropriate target volumes on the storage subsystem such as the replacement source storage subsystem 108c, for example, according to size and compatibility. For example, the storage management may use a target volume matching algorithm to create copy relationship pairings between the volumes of the original source storage subsystem and the volumes of a replacement source storage subsystem based on volume size and type. In other embodiments, target volumes of the replacement source storage subsystem may be identified in a predominantly automatic fashion, such a user selecting from or making changes to an automatically provided list, or may be identified manually by a human operator and the selection manually input into a graphical user interface.

Upon identification (block 618) of target volumes of the replacement source storage subsystem, copy relationships between the original source storage subsystem and the replacement source storage subsystem, may be established (block 622). In one embodiment, the storage management software can fully automatically establish a second set of copy services relationships between the original source volumes and the replacement source volumes, based upon the identification (block 614) of the copy relationships to be migrated to the replacement source storage subsystem. For example, using a multi-target capability, the storage management can create multi-storage volume swap (e.g. Hyper-Swap®) capable mirror relationships (e.g. Metro Mirror PPRC relationships) between the original source volumes and the new replacement source volumes. In other embodiments, the second set of copy services relationships between the original source volumes and the replacement source volumes may be established in a predominantly automatic fashion, such a user selecting from an automatically provided list, or may be identified manually by a human operator and the selection manually input into a graphical user interface.

Upon establishment (block 622) of the copy relationships between the volumes of the original source storage subsystem and the volumes of the replacement source storage subsystem, both the original copy relationships between the original source storage subsystem 108a and the original target storage subsystem 108b (FIG. 4) as well as the new copy relationships between the original source storage subsystem 108a and the replacement source storage subsystem 108c, will be mirroring data, as represented by the mirror process 400 and the migration process 410 (block 630). These data mirroring/migration operations may use suitable data mirroring tools such as Metro Mirror PPRC by IBM or SRDF/STAR by EMC, for example. Accordingly, any updates to the primary storage subsystem 108a are mirrored not only to the secondary storage subsystem 108b in response to ongoing I/O operations and the copy relationships established between the source storage subsystem 108a and the target storage subsystem 108b, but are also mirrored over to the replacement source storage subsystem 108c in response to ongoing I/O operations and the copy relationships established between the original source storage subsystem 108a and the replacement storage subsystem 108c.

A determination (block 634) is made as to whether the migration of data from the volumes of the original source storage subsystem to the volumes of the replacement source storage subsystem has reached full duplex status (e.g. all new copy relationships have achieved identical copy status). If so, I/O operations from the hosts 14 to the volumes of the original source storage subsystem are quiesced (block 642) in anticipation of or as a part of the multi-storage volume swap function (648). In one embodiment, the storage management can automatically issue a quiesce I/O operations command once full duplex status has been achieved for the migration. For example, a multi-storage volume swap command automatically issued by the storage management may be a HyperSwap® with Quiesce command modified in accordance with the present description, to temporarily quiesce I/O operations while the swap is taking place. In one embodiment, the I/O operations which have already started when the multi-storage volume swap is initiated, may be permitted to complete. Any subsequent I/O operations may be placed in a queue at the originating host to await completion of the multi-storage volume swap operation. It is appreciated that in other embodiments, the quiescing of the I/O operations may be performed manually.

Once I/O operations have been quiesced, a multi-storage volume swap from the original source storage subsystem to the replacement source storage subsystem is initiated (block 648) by the storage management of the present description. In one embodiment, the storage management can automatically issue a swap initiation command. Accordingly, in the illustrated embodiment, a swap from the volumes of the original source storage subsystem 108a to the volumes of the replacement source storage subsystem 108b may be automatically initiated once full duplex of the copy relationship pairs of the original source storage subsystem and the replacement source storage subsystem, has been reached and I/O operations have been quiesced. Otherwise, the data migration operation (block 630) continues until all the new relationships have all reached full duplex.

In one embodiment, a multi-storage volume swap function such as HyperSwap® may be modified in accordance with the present description to provide the swap from the volumes of the original source storage subsystem 108a to the volumes of the replacement source storage subsystem 108c. In this embodiment, the HyperSwap® function is modified for use in facilitating the migration operation.

A disaster recovery capability provided by a second use of a multi-storage volume swap capability may, in some embodiments, be optionally provided between the volumes in the original copy relationship, that is, between the volumes of the original source storage subsystem 108a and the volumes of the original target storage subsystem 108b if appropriate. Thus, a capability to swap the volumes of the original source storage subsystem and the volumes of the original target storage subsystem to access the volumes of the original target storage subsystem instead of the volumes of the original source storage subsystem, in input/output operations issued by at least one host, in the event of a failure at the original source storage subsystem may be maintained, while actively migrating, that is mirroring, the data stored in the volumes of the original source storage subsystem from the volumes of the original source storage subsystem to the volumes of the replacement source storage subsystem.

In the illustrated embodiment, the multi-storage volume swap function of the present description, automatically terminates (block 650) the copy relationships between the original source storage subsystem and the original target storage subsystem, and automatically reestablishes (block 654) those terminated relationships as new copy relationships between the replacement source storage subsystem and the original target storage subsystem. Thus, unlike existing multi-storage volume swap functions such as existing HyperSwap® functions, instead of unquiescing (that is, resuming) I/O operations once the existing HyperSwap® process has completed, a multi-storage swap function such as HyperSwap® modified in accordance with the present description to facilitate source migration, may automatically first terminate the copy services relationships between the original source and target volumes and automatically establish the replacement copy services relationships between the new replacement source volumes and the original target volumes, with a no copy option, for example. It is appreciated that in other embodiments, one or more of the copy relationships may be manually terminated or manually reestablished in connection with the swap of source storage subsystems. Since the volumes of the original target storage subsystem are already a full copy of the volumes of the replacement source storage system, a full copy operation is not needed to prepare for mirroring from the volumes of the replacement storage subsystem to the volumes of the original target storage subsystem once I/O operations resume (block 660).

In another operation, once the replacement copy relationships between the replacement source storage subsystem 108c and the original target storage subsystem 108b are in place, paths from the hosts to the volumes of the original source storage subsystem may be automatically swapped to the volumes of the replacement source storage subsystem so that I/O operations from the hosts are swapped (block 656) so that I/O operations once resumed are to be redirected to the volumes of the replacement source storage subsystem instead of to the volumes of the original source storage subsystem.

In one embodiment, such volume swapping may be achieved by modifying appropriate data structures such as storage Unit Control Blocks (UCBs) 150a (FIG. 2) of the multi-storage volume swap manager 140a. In the illustrated embodiment, the UCB's identify the storage locations in the primary and secondary storage subsystems, the status of such storage subsystem locations, and the network path to the particular storage locations of the storage subsystems. Thus, for example, a UCB identifying storage locations of the replacement storage subsystem 108a may be modified to identify those storage locations of the replacement storage subsystem 108c as the primary storage locations for the I/O operations from the hosts and as the source locations for the mirroring operation. It is appreciated that in other embodiments, paths from the hosts to the original source storage subsystem may be manually swapped to the replacement source storage subsystem. Although the multi-storage volume swap manager 140a is depicted as part of the operations of a host, it is appreciated that in some embodiments, that path swapping may be performed by a storage control unit. Hence, in some embodiments, swapping of a replacement storage unit and an original storage unit may be performed in a manner which is transparent to the host issuing input/output operations. Thus, in such embodiments, the host need not modify data structures to designate the replacement storage unit to be accessed by its input/output operations instead of the original storage unit.

The multi-storage volume swap may be completed (block 660) to allow I/O operations to automatically resume, but directed to the volumes of the replacement storage subsystem 108c instead of to the volumes of the original source storage subsystem 108a. Any new data writes to the volumes of the replacement storage subsystem 108c are mirrored to the volumes of the original target storage subsystem 108b in accordance with the copy relationships established (block 654) between the replacement storage subsystem 108c and the original target storage subsystem 108b. It is appreciated that in other embodiments, I/O operations may be manually resumed to complete the swap.

It is seen from the above that storage management in accordance with the present description can provide an automated process to migrate data from one source volume to another while maintaining disaster recovery capability, and substantially obviating extra data and data copying which typically resulted in use of prior procedures. Thus, disaster recovery capability may be maintained throughout the data migration. In addition, a migration operation may be completed with very brief or no interruption of ongoing I/O operations. As a result, it is believed that users will be able to migrate data in situations where it may have previously been impractical, such as for example dealing with a performance problem while business critical work is being executed.

Thus, in one aspect of the present description, the migration of a storage system configured for disaster recovery may be undertaken with little or no impact upon the disaster recovery capability between the original primary and secondary volumes. In one embodiment, a multi-storage volume swap function such as HyperSwap®, for example, is utilized and may be modified to automate the migration of data onto a new source storage subsystem without requiring the user to manually remove existing copy relationships or to create new copy relationships. It is believed that storage management in accordance with the present description may save the user significant time while reducing opportunity for error which may occur in attempts to create thousands of copy relationship pairs manually.

Figure 7:
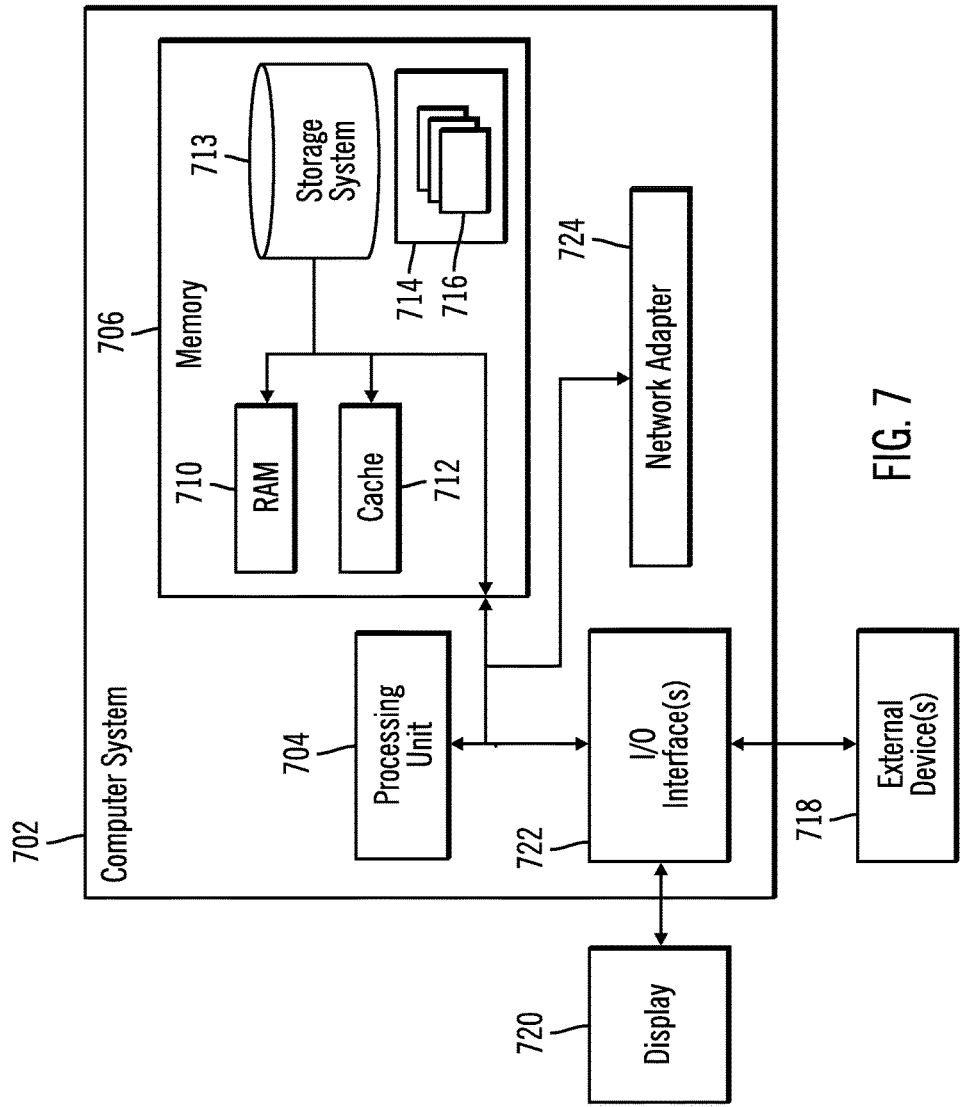
FIG. 7 illustrates one node of a network computing environment, employing data migration using a multi-storage volume swap in accordance with one embodiment of the present description.

FIG. 7 illustrates one embodiment of a node 700 of a distributed computing system such a host, application server, storage controller, server or virtual server, of the storage area network 102 of FIG. 2. However, it is appreciated that the node 700 of FIG. 7 may comprise any suitable computing device 702, such as a mainframe, server, personal computer, laptop, handheld computer, telephony device, network appliance, virtualization device, storage controller, failover lock device, embedded device, etc.

It is appreciated that the nodes of a distributed computing system may perform a variety of data processing functions such as data storage and management in disk arrays, for example. Thus, the node of FIG. 7 may perform data processing tasks such as data backup, data deduplication, data mining data capture, data archiving, data replication, bandwidth reduced data replication, encryption of data, etc. and typically involve the transfer of large amounts of data between the hosts 114 and storage 106a, 106b (FIG. 2).

The node 700 may perform data migration management in accordance with one or more embodiments described herein.

The node may include a processor 704 (e.g., a microprocessor), a memory 706 (e.g., a volatile memory device 710), cache 712, and storage 713 (e.g., a non-volatile storage, such as magnetic disk drives, optical disk drives, a tape drive, flash storage etc.). A storage 714 may comprise an internal storage device or an attached or network accessible storage. Programs 716 in the storage 714 are loaded into the memory 710 and executed by the processor 704 as represented by an operating system and data processing programs 716.

Programs 716 are also provided in the memory 704 for data migration management in accordance with the present description.

The node further includes a network controller or adapter 724 to enable communication with a network such as an Ethernet, a Fibre Channel Arbitrated Loop, etc. which interconnects the nodes of the distributed computing system. The network controller or adapter 724 may also enable communication with a network path to a host 14 or communication with a network path to storage 6.

User input devices 718 provide user input to the processor 704, and may include a keyboard, mouse, pen-stylus, microphone, touch sensitive display screen, or any other suitable activation or input mechanism. Output devices 720 are capable of rendering information transmitted from the processor 704, or other component, such as a display monitor, printer, storage, etc. The input devices 718, and output devices 720 may be coupled directly to a node using a suitable I/O interface 722 such as a KVM (keyboard, video, mouse) switch in some applications.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    writing updates to original source storage units in response to received input/output operations;
    mirroring data stored in the original source storage units including the updates, from the original source storage units to original target storage units while updates are actively being written to the original source storage units;
    migrating the data stored in the original source storage units including the updates from the original source storage units to associated replacement source storage units while actively mirroring the data stored in the original source storage units including the updates, from the original source storage units to the original target storage units;
    quiescing input/output operations to original source storage units when migrating to associated replacement source storage units is complete so that associated replacement source storage units are complete copies of associated original source storage units,
    resuming input/output operations and writing updates to the replacement source storage units instead of to the original source storage units, in response to received input/output operations; and
    mirroring data stored in the replacement source storage units, from the replacement source storage units to the original target storage units.

2. The method of claim 1 wherein the mirroring data stored in the original source storage units includes mirroring data from the original source storage units to the original target storage units in copy relationships with associated original source storage units.

3. The method of claim 2 further comprising swapping the replacement source storage units for the original source storage units wherein the swapping includes the quiescing input/output operations to the original source storage units, terminating the copy relationships of the target storage units with associated original source storage units, reestablishing the copy relationships as copy relationships of the original target storage units with associated replacement source storage units, and the resuming input/output operations wherein the writing updates to the replacement source storage units instead of the original source storage units is in response to the resumed input/output operations issued by at least one host, and wherein the mirroring data stored in the replacement source storage units includes mirroring data from the replacement source storage units to the original target storage units in the reestablished copy relationships with associated replacement source storage units.

4. The method of claim 2 wherein the migrating includes in response to a command, automatically establishing copy relationships of the replacement source storage units with associated storage units of the original source storage units based upon the copy relationships of the original target storage units with associated original source storage units.

5. The method of claim 3 wherein the terminating the copy relationships of the original target storage units with associated original source storage units and the reestablishing the copy relationships as copy relationships of the original target storage units with associated replacement source storage units, are performed automatically in response to a command.

6. The method of claim 1 further comprising:
    maintaining a capability to swap the original source storage units and the original target storage units to write updates to the original target storage units instead of to the original source storage units, in input/output operations issued by at least one host, in the event of a failure at the original source storage units while actively migrating the data stored in the original source storage units from the original source storage units to the replacement source storage units.

7. The method of claim 3 further comprising determining when the migrating of the data stored in the original source storage units including the updates from the original source storage units to the replacement source storage units is at least one of complete and predominantly complete, and wherein said swapping is initiated in response to a determination that the migrating of the data stored in the original source storage units including the updates from the original source storage units to the replacement source storage units is at least one of complete and predominantly complete.

8. A system, comprising:
    at least one storage subsystem including a plurality of original source storage units, a plurality of original target storage units, a plurality of replacement source storage units and at least one storage controller adapted to access and control storage units of the at least one storage subsystem; and
    at least one computer readable storage medium having computer readable program code embodied therein that is enabled to cause operations to be performed, the operations comprising:
    writing updates to original source storage units in response to received input/output operations;
    mirroring data stored in the original source storage units including the updates, from the original source storage units to original target storage units while updates are actively being written to the original source storage units;
    migrating the data stored in the original source storage units including the updates from the original source storage units to associated replacement source storage units while actively mirroring the data stored in the original source storage units including the updates, from the original source storage units to the original target storage units;

quiescing input/output operations to original source storage units when migrating to associated replacement source storage units is complete so that associated replacement source storage units are complete copies of associated original source storage units, resuming input/output operations and writing updates to the replacement source storage units instead of to the original source storage units, in response to received input/output operations; and mirroring data stored in the replacement source storage units, from the replacement source storage units to the original target storage units.

9. The system of claim 8 wherein the mirroring data stored in the original source storage units includes mirroring data from the original source storage units to the original target storage units in copy relationships with associated original source storage units.

10. The system of claim 9 further comprising at least one host wherein the operations further comprise swapping the replacement source storage units for the original source storage units wherein the swapping includes the quiescing input/output operations to the original source storage units, terminating the copy relationships of the target storage units with associated original source storage units, reestablishing the copy relationships as copy relationships of the original target storage units with associated replacement source storage units, and the resuming input/output operations wherein the writing updates to the replacement source storage units instead of the original source storage units is in response to the resumed input/output operations issued by at least one host, and wherein the mirroring data stored in the replacement source storage units includes mirroring data from the replacement source storage units to the original target storage units in the reestablished copy relationships with associated replacement source storage units.

11. The system of claim 9 wherein the migrating includes in response to a command, automatically establishing copy relationships of the replacement source storage units with associated storage units of the original source storage units based upon the copy relationships of the original target storage units with associated original source storage units.

12. The system of claim 10 wherein the terminating the copy relationships of the original target storage units with associated original source storage units and the reestablishing the copy relationships as copy relationships of the original target storage units with associated replacement source storage units, are performed automatically in response to a command.

13. The system of claim 10 wherein the operations further comprise:

maintaining a capability to swap the original source storage units and the original target storage units to write updates to the original target storage units instead of to the original source storage units, in input/output operations issued by at least one host, in the event of a failure at the original source storage units while actively migrating the data stored in the original source storage units from the original source storage units to the replacement source storage units.

14. The system of claim 10 wherein the operations further comprise determining when the migrating of the data stored in the original source storage units including the updates from the original source storage units to the replacement source storage units is at least one of complete and predominantly complete, and wherein said swapping is initiated in response to a determination that the migrating of the data stored in the original source storage units including the updates from the original source storage units to the replacement source storage units is at least one of complete and predominantly complete.

15. A computer program product for managing data storage operations in connection with at least one storage subsystem including a plurality of original source storage units, a plurality of original target storage units, a plurality of replacement source storage units, and at least one storage controller adapted to access and control storage units of the at least one storage subsystems, the computer program product comprising at least one computer readable storage medium having computer readable program code embodied therein that is enabled to cause operations to be performed, the operations comprising:

writing updates to original source storage units in response to received input/output operations;

mirroring the data stored in the original source storage units including the updates, from the original source storage units to original target storage units while updates are actively being written to the original source storage units;

migrating the data stored in the original source storage units including the updates from the original source storage units to associated replacement source storage units while actively mirroring the data stored in the original source storage units including the updates, from the original source storage units to the original target storage units;

quiescing input/output operations to original source storage units when migrating to associated replacement source storage units is complete so that associated replacement source storage units are complete copies of associated original source storage units, resuming input/output operations and writing updates to the replacement source storage units instead of to the original source storage units, in response to received input/output operations; and mirroring data stored in the replacement source storage units, from the replacement source storage units to the original target storage units.

16. The computer program product of claim 15 wherein the mirroring data stored in the original source storage units includes mirroring data from the original source storage units to the original target storage units in copy relationships with associated original source storage units.

17. The computer program product of claim 16 also for managing data storage operations in connection with at least one host, wherein the operations further comprise swapping the replacement source storage units for the original source storage units wherein the swapping includes the quiescing input/output operations to the original source storage units, terminating the copy relationships of the target storage units with associated original source storage units, reestablishing the copy relationships as copy relationships of the original target storage units with associated replacement source storage units, and the resuming input/output operations wherein the writing updates to the replacement source storage units instead of the original source storage units is in response to the resumed input/output operations issued by at least one host, and wherein the mirroring data stored in the replacement source storage units includes mirroring data from the replacement source storage units to the original target storage units in the reestablished copy relationships with associated replacement source storage units.

18. The computer program product of claim 16 wherein the migrating includes in response to a command, automatically establishing copy relationships of the replacement source storage units with associated storage units of the original source storage units based upon the copy relationships of the original target storage units with associated original source storage units.

19. The computer program product of claim 17 wherein the terminating the copy relationships of the original target storage units with associated original source storage units and the reestablishing the copy relationships as copy relationships of the original target storage units with associated replacement source storage units, are performed automatically in response to a command.

20. The computer program product of claim 17 wherein the operations further comprise:
maintaining a capability to swap the original source storage units and the original target storage units to write updates to the original target storage units instead of to the original source storage units, in input/output operations issued by at least one host, in the event of a failure at the original source storage units while actively migrating the data stored in the original source storage units from the original source storage units to the replacement source storage units.

21. The computer program product of claim 17 wherein the operations further comprise determining when the migrating of the data stored in the original source storage units including the updates from the original source storage units to the replacement source storage units is at least one of complete and predominantly complete, and wherein said swapping is initiated in response to a determination that the migrating of the data stored in the original source storage units including the updates from the original source storage units to the replacement source storage units is at least one of complete and predominantly complete.

* * * * *